United States Patent [19]

König et al.

[11] Patent Number: 5,783,651

[45] Date of Patent: Jul. 21, 1998

[54] PROCESS FOR THE PRODUCTION OF POLY (DIORGANOSILOXANE)/POLYCARBONATE BLOCK COPOLYMERS

[75] Inventors: Annett König, Krefeld; Steffen Kühling, Meerbusch, both of Germany

[73] Assignee: Bayer AG, Leverkusen, Germany

[21] Appl. No.: 730,105

[22] Filed: Oct. 15, 1996

[30] Foreign Application Priority Data

Oct. 23, 1995 [DE] Germany .................. 195 39 290.6

[51] Int. Cl.$^6$ .................................................. C08G 77/06
[52] U.S. Cl. .................... 528/21; 528/23; 525/464
[58] Field of Search ................... 528/21, 23; 525/464

[56] References Cited

U.S. PATENT DOCUMENTS

| 5,068,302 | 11/1991 | Horlacher et al. | 528/26 |
| 5,227,449 | 7/1993 | Odell et al. | 525/26 |
| 5,504,177 | 4/1996 | King, Jr., et al. | |

*Primary Examiner*—Melvyn I. Marquis
*Attorney, Agent, or Firm*—Connolly and Hutz

[57] ABSTRACT

The present invention provides a process for the production of poly(diorganosiloxane)/polycarbonate block copolymers in a melt using specific transesterification catalysts.

7 Claims, 3 Drawing Sheets

25000:1

25000:1

25000:1

PROCESS FOR THE PRODUCTION OF POLY (DIORGANOSILOXANE)/POLYCARBONATE BLOCK COPOLYMERS

The present invention provides a process for the production of thermoplastic poly(diorganosiloxane)/polycarbonate block copolymers with average molecular weights $M_W$ (weight average, determined by gel chromatography) of 18000 to 60000, preferably of 19000 to 40000, from aromatic, Si-free diphenols, carbonic acid diaryl esters and polydiorganosiloxanes in the presence of catalysts at temperatures of between 80° C. and 320° C. and pressures of 1000 mbar to 0.01 mbar, which process is characterised in that the catalysts used are quaternary ammonium compounds and/or quaternary phosphonium compounds of the formulae (I) and/or (II)

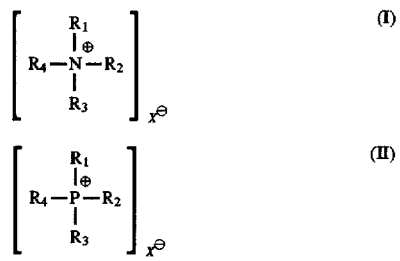

in which $R_{1-4}$ are identical or different $C_1$–$C_{30}$ alkyls, $C_6$–$C_{10}$ aryls or $C_5$–$C_6$ cycloalkyls, wherein at least one residue of $R_{1-4}$ is a $C_8$–$C_{30}$ alkyl, preferably $C_{12}$–$C_{20}$ alkyl and in which $X^-$ is an anion in which the corresponding acid/base pair $H^\oplus + X^\ominus \leftrightarrows HX$ has a pKB of 1 to 11, in quantities of $10^{-1}$ to $10^{-8}$ mol, relative to 1 mol of Si-free diphenol, and that the polydiorganosiloxane component used comprises α,ω-bishydroxyaryl-, α,ω-bishydroxyalkyl-, α,ω-bisacyl- or α,ω-bishydroxyacyl-polydiorganosiloxanes in quantities by weight of 30 wt. % to 0.5 wt. %, preferably of 7 wt. % to 1 wt. %, relative to the total weight of Si-free diphenols and polydiorganosiloxanes.

The polydiorganosiloxanes have degrees of polymerisation of their diorganosiloxane structural units "n" of 5 to 100, preferably between 5 and 80 and in particular between 10 and 50.

For the purposes of the present invention, Si-free diphenols are diphenols which contain no chemically attached silicon atoms. $X^-$ anions of (I) and (II) are, for example, tetraphenylhydridoborate and fluoride.

The polydiorganosiloxane/polycarbonate block copolymers obtainable according to the invention have a diorganosiloxane structural unit content of between 30 wt. % and 0.5 wt. %, preferably of between 7 wt. % and 1 wt. %, in each case relative to the total weight of the polydiorganosiloxane/polycarbonate block copolymers.

The polydiorganosiloxane/polycarbonate block copolymers produced using the process according to the invention have better mould release properties and flow, a rubber/glass transition which is displaced to lower temperatures and improved ESC behaviour. They are also produced in solvent-free form.

The production of aromatic oligo/polycarbonates using the melt transesterification process is known from the literature and has been described, for example, in *Chemistry and Physics of Polycarbonates, Polymer Reviews*, H. Schnell, volume 9, John Wiley & Sons Inc. (1964).

The production of polydiorganosiloxane/polycarbonate block copolymers by the phase interface process is known from the literature and has been described, for example, in U.S. Pat. No. 3,189,662, U.S. Pat. No. 3,419,634, DE-OS 334 782 (Le A 22 594), EP 0 122 535 (Le A 22 594-EP).

U.S. Pat. No. 5,227,449 describes the preparation of polydiorganosiloxane/polycarbonate block copolymers using the melt transesterification process from bisphenol, diaryl carbonate and silanol end-terminated polysiloxanes using catalysts which are used as binders for charge transport molecules in photoconductive layers. In this document, the siloxane compounds used are polydiphenyl- or polydimethylsiloxane telomers with silanol end groups (from the company Petrarch System, now Hüls).

It has now been found that, in comparison with conventional transesterification catalysts (see comparative Example 1c), it is more readily possible to synthesise polydiorganosiloxane/polycarbonate block copolymers via the transesterification process with catalysts of the general formulae (I) or (II) having at least one $C_8$–$C_{30}$ alkyl residue on the nitrogen or phosphorus atom.

The catalysts of the formulae (I) and (II) have already been used for the production of other polycarbonates, for example of bisphenol A polycarbonates. When the catalysts of the general formula (I) or (II) having at least one $C_8$–$C_{30}$ alkyl residue on the N or P atom are used for this purpose, no particular effects are found in comparison with other ammonium or phosphonium catalysts (see comparative examples 1a and 1b).

The α,ω-bishydroxyaryl polydiorganosiloxanes to be used according to the invention are known, for example, from U.S. Pat. No. 3,419,634.

The α,ω-bishydroxyaryl polydiorganosiloxanes to be used according to the invention are known and commercially available, for example from the company Th. Goldschmidt, Essen.

The α,ω-bisacyl polydiorganosiloxanes to be used according to the invention are known, for example, from DE-OS 33 34 782 (Le A 22 594).

The α,ω-bishydroxyacyl polydiorganosiloxanes to be used according to the invention are known and commercially available, for example from the company Th. Goldschmidt, Essen.

The polydiorganosiloxanes to be used according to the invention preferably have hydroxyaryloxy, hydroxyalkoxy, hydroxyacyloxy, ω-hydroxycaprolactone or acetoxy end groups.

The polydiorganosiloxanes which are preferably to be used are in particular of the formulae (III), (IV) or (V)

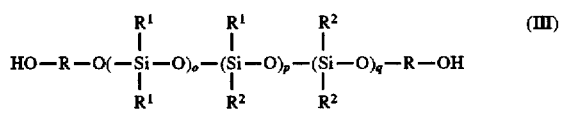

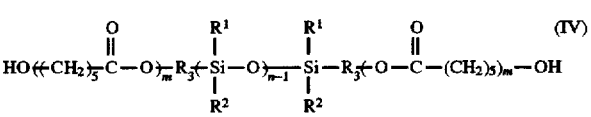

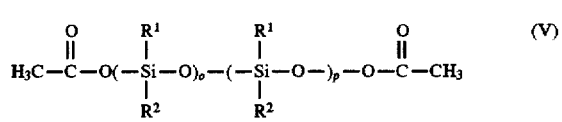

In these formulae, R is a monocyclic or polycyclic arylene residue with 6 to 30 C atoms, preferably 6 C atoms or a linear or branched alkylene residue with 1 to 30 C atoms, or 3 to 30 C atoms, preferably 3 to 10 C atoms.

Preferred residues R are those of the formula (VIa)

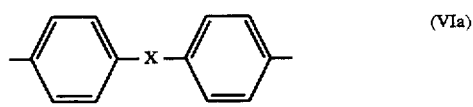
(VIa)

in which —X— is a $C_1$–$C_{12}$ alkylidene, $C_7$–$C_{12}$ aralkylidene, $C_5$–$C_{15}$ cycloalkylidene, —S—, —$SO_2$—, —O—,

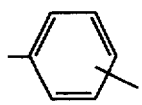

or a single bond, particularly preferably

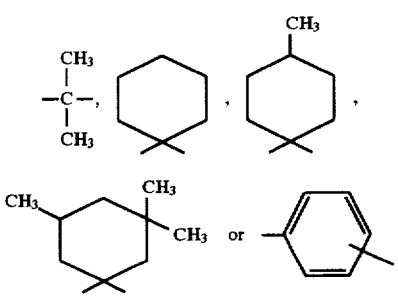

$R^1$ and $R^2$ are identical or different and linear, optionally halogenated alkyl, branched, optionally halogenated alkyl, aryl or halogenated aryl, preferably methyl.

$R_3$ is linear, optionally halogenated alkylene, branched, optionally halogenated alkylene or arylene, preferably linear or branched $C_1$–$C_{16}$ alkylene, particularly preferably linear propylene, linear butylene, linear pentylene and linear hexylene.

The number of diorganosiloxane units "n" is obtained for the formula (III) from "o+p+q", for the formula (IV) from "n" and for the formula (V) from "o+p". In each case, it is between 5 and 100, preferably between 20 and 80 and in particular between 25 and 50. The index "m" is 1 to 30, preferably 5 to 15.

Examples of residues R are

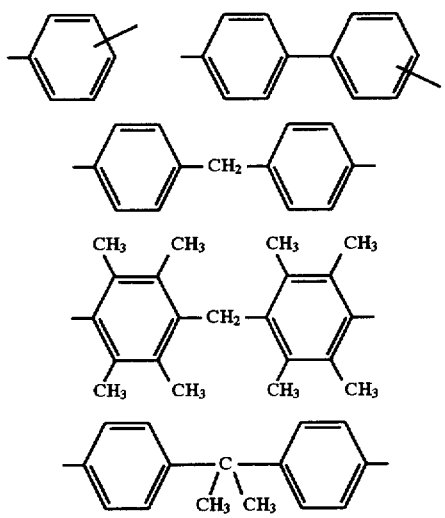

-continued

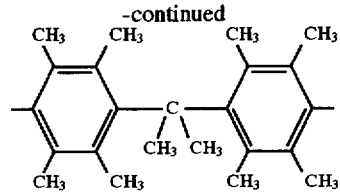

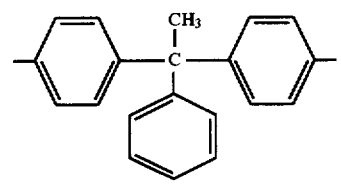

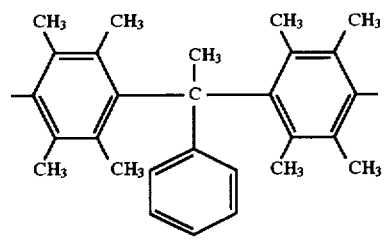

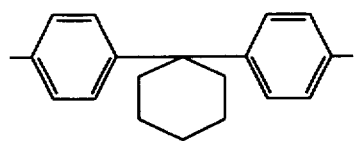

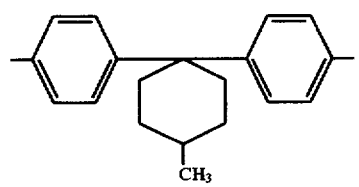

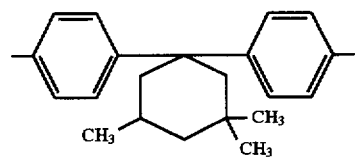

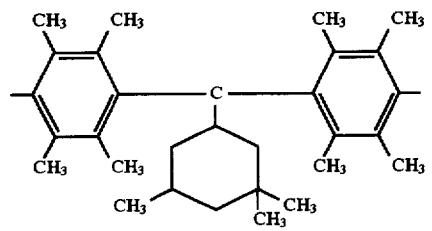

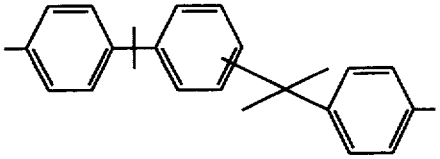 X = O, S, $SO_2$, C = O and

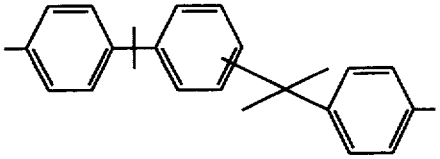

Examples of residues R¹— are methyl, ethyl, propyl, butyl and phenyl.

Examples of residues R²— are also methyl, ethyl, propyl, butyl and phenyl.

Examples of residues —R₃— are methylene, ethylene, i,n-propylene, i,n-butylene, i,n-pentylene and i,n-hexylene.

Examples of compounds of the formulae (III), (IV) and (V) are

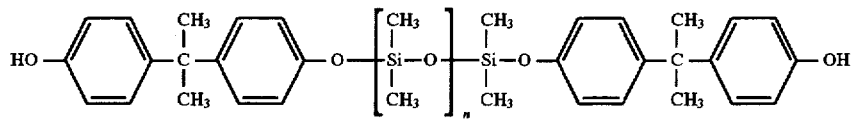

n = 5–80

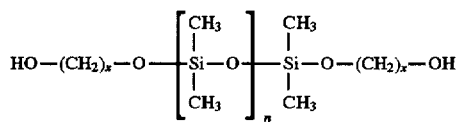

n = 5–80;
x = 1–20.

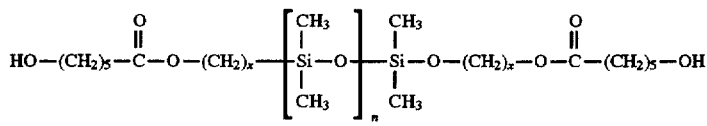

n = 5–80
x = 1–20 and

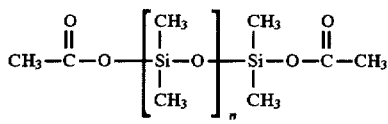

n = 5–80

Si-free diphenols suitable for the process according to the invention are those of the formula (VI)

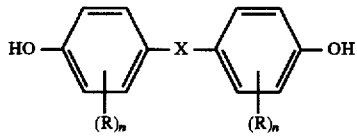

in which

X is $C_1$–$C_{12}$ alkylidene or $C_5$–$C_{15}$ cycloalkylidene, $C_7$–$C_{12}$ aralkylidene, —$SO_2$—,

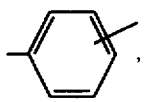

S or a single bond and R is $CH_3$, Cl or Br and n is zero, 1 or 2.

Preferred diphenols are, for example:
4,4'-dihydroxydiphenyl,
4,4'-dihydroxydiphenylsulphide,
2,2-bis-(4-hydroxyphenyl)propane,
2,2-bis-(3,5-dimethyl-4-hydroxyphenyl)propane,
2,2-bis-(3,5-dichloro-4-hydroxyphenyl)propane,
2,2-bis-(3,5-dibromo-4-hydroxyphenyl)propane,
1,1-bis-(4-hydroxyphenyl)cyclohexane,
1,1-bis-(4-hydroxyphenyl)-3,3,5-trimethylcyclohexane and
1-phenyl-2,2-bis-(4-hydroxyphenyl)propane.

Particularly preferred diphenols among those stated above are 2,2-bis-(4-hydroxyphenyl)propane and 1,1-bis-(4-hydroxyphenyl)-3,3,5-trimethylcyclohexane.

Instead of the Si-free diphenols, it is also possible to use oligocarbonates containing OH groups prepared from these diphenols for the process according to the invention.

For the purposes of the present invention, carbonic acid diesters are di-$C_6$–$C_{20}$-aryl esters, preferably the diesters of phenol or alkyl-substituted phenols, thus diphenyl carbonate or, for example, dicresyl carbonate. Relative to 1 mol of the sum of Si-free diphenols and polydiorganosiloxanes, the carbonic acid diesters are used in [quantities] of 1.01 to 1.30 mol, preferably of 1.02 to 1.15 mol.

The polycarbonate block copolymers may purposefully and controllably be branched by using small quantities of branching agents. Some suitable branching agents are:
phloroglucinol,
4,6-dimethyl-2,4,5-tri-(4-hydroxyphenyl)-hept-2-ene,
4,6-dimethyl-2,4,5-tri-(4-hydroxyphenyl)heptane,
1,3,5-tri-(4-hydroxyphenyl)benzene,
1,1,1-tri-(4-hydroxyphenyl)ethane,
tri-(4-hydroxyphenyl)phenylmethane,
2,2-bis-[4,4-bis-(4-hydroxyphenyl)cyclohexyl]propane,
2,4-bis-(4-hydroxyphenylisopropyl)phenol,
2,6-bis-(2-hydroxy-5'-methylbenzyl)-4-methylphenol,
2-(4-hydroxyphenyl)-2-(2,4-dihydroxyphenyl)propane,
hexa-(4-(4-hydroxyphenylisopropyl)phenyl-ortho-terephthalic acid ester,
tetra-(4-hydroxyphenyl)methane,
tetra-(4-(4-hydroxyphenylisopropyl)phenoxy)methane,
1,4-bis-((4',4''-dihydroxytriphenyl)methyl)benzene and in particular
α,α',α''-tris-(4-hydroxyphenyl)-1,3,5-triisopropylbenzene.

Further possible branching agents are 2,4-dihydroxybenzoic acid, the phenyl or cresyl esters thereof, trimesic acid, the phenyl or cresyl esters thereof, cyanuric chloride and 3,3-bis-(3-methyl-4-hydroxyphenyl)-oxo-2,3-dihydroindole.

The branching agents, which are optionally to be used in a quantity of 0.05 to 0.3 mol. %, relative to the Si-free diphenols used, may be used together with the Si-free diphenols.

Molecular weights are generally limited by the quantity of carbonic acid diaryl ester and by the reaction conditions. Monophenols, for example phenol or alkylphenols, may moreover additionally be added as chain terminators (c.f. for example, EP-360 598).

Care should be taken to ensure that the reaction components, namely the Si-free diphenols, carbonic acid diaryl esters and the polydiorganosiloxanes contain no alkali metal and alkaline earth metal ions, wherein quantities of less than 0.1 ppm of alkali metal and alkaline earth metal ions may be tolerated. Such pure carbonic acid diaryl esters, polydiorganosiloxanes or Si-free diphenols may be obtained by recrystallising, washing or distilling the carbonic acid diaryl esters, polydiorganosiloxanes or Si-free diphenols. In the process according to the invention, the content of alkali metal and alkaline earth metal ions should be <0.1 ppm in the Si-free diphenol, the polydiorganosiloxane and in the carbonic acid diester.

For the purposes of the process according to the invention, examples of catalysts are:
hexadecyltrimethylammonium tetraphenylhydridoborate,
hexadecyltributylphosphonium tetraphenylhydridoborate,
hexadecyltrimethylammonium fluoride,
hexadecyltributylphosphonium fluoride.

The catalysts of the formulae (I) and (II) are known from the literature (E. V. Dehmlov, S. S. Dehmlov, *Phase Transfer Catalysts*, 2nd edition, Verlag Chemie, 1983; Houben-Weyl, *Methoden der organischen Chemie*, 4th edition, volume XI/2, 1958, pages 591 et seq., volume XII/1, 1963, pages 79 et seq., volume XIII/3b, 1983, pages 763 et seq. and Charles M. Starks and Charles Ciotta, *Phase Transfer Catalysis*, Academic Press, 1978) or may be produced using processes known from the literature (c.f. loc. cit.).

These catalysts are preferably used in quantities of $10^{-2}$ to $10^{-8}$ mol, relative to 1 mol of Si-free diphenol. The catalysts may be used alone or in combination with each other (two or more) or in combination with other transesterification catalysts known for polycarbonate production. Other known transesterification catalysts are, for example, alkali metal or alkaline earth metal compounds according to U.S. Pat. No. 3,272,601, other ammonium or phosphonium compounds according to U.S. Pat. No. 3,442,864, JA 14 742/72 and U.S. Pat. No. 5,399,659 and guanidine systems according to U.S. Pat. No. 5,319,066.

Examples of other known transesterification catalysts are alkali metal hydroxides, alkali metal phenolates, alkali metal diphenolates, tetramethylammonium hydroxide and tetramethylammonium tetraphenylhydridoborate.

The process according to the invention may be performed in a single stage. In this case, the following procedure is used:

The Si-free dihydroxy compound, the polydiorganosiloxane and the carbonic acid diester are melted at temperatures of 80° to 250° C., preferably of 100° to 230° C., particularly preferably of 120° to 190° C. under standard pressure in 0 to 5 hours, preferably 0.25 to 3 hours. The catalyst may be added before the components are melted or to the melted components. An oligocarbonate is then produced by applying a vacuum, increasing the temperature and removing the monophenol by distillation. The polycarbonate is then produced in a polycondensation reaction by further increasing the temperature to 240° to 400° C. and reducing the pressure down to 0.01 mbar. Alternatively, the polydiorganosiloxane may also be added together with the catalyst to the other melted components.

It is, however, possible to perform the process according to the invention in two separate stages, wherein, in the first stage, the oligocarbonate is produced using catalysts (I) and/or (II) and, in the second stage, the polycarbonate is produced from the oligocarbonates, wherein alkali metal or alkaline earth metal catalysts may optionally additionally be used, and the mixture is maintained at temperatures of 250° to 320° C., preferably of 280° C. to 290° C. and a pressure of <100 mbar to 0.01 mbar over a short period of <3 hours to 10 minutes, preferably of <1 hour to 20 minutes, particularly preferably of <30 to 20 minutes.

The polydiorganosiloxane/oligocarbonates produced in this case as an intermediate have OH/aryl carbonate end group ratios in the range of 60:40 to 5:95, preferably of 45:55 to 10:90, which may be determined by photometric determination of the OH end groups with $TiCl_4$.

The OH end group of the oligocarbonates is defined as:

x mol. %=100 (number of OH end groups)/(total number of end groups).

The process according to the invention may be performed continuously or discontinuously in stirred tank reactors, film evaporators, falling-film evaporators, stirred tank reactors in series, extruders, kneaders, simple disk reactors and high viscosity disk reactors.

The aromatic polycarbonate block copolymers of the process according to the invention should have weight average molecular weights $M_w$ of 18000 to 60000, preferably of 19000 to 40000, determined by measuring the relative solution viscosity in dichloromethane or in mixtures of equal quantities by weight of phenol/o-dichlorobenzene, calibrated by light scattering.

The polycarbonate block copolymers produced according to the invention have a light intrinsic colour, preferably have a low OH end group content of <1200 ppm and are resistant to hydrolysis and heat.

Fillers and reinforcing agents may be added to the polycarbonate block copolymers produced according to the invention in order to improve their properties. Such substances which may inter alia be considered are: stabilisers (for example UV, heat, gamma radiation stabilisers), antistatic agents, flow auxiliaries, mould release agents, flame retardants, pigments, finely divided minerals, fibres, for example alkyl and aryl phosphites, phosphates, phosphanes, low molecular weight carboxylic acid esters, halogen compounds, salts, chalk, silica flour, glass and carbon fibres. Other polymers, for example polyolefins, polyurethanes or polystyrene, may moreover be added to the polycarbonate block copolymers produced according to the invention.

These substances are preferably added to the finished polycarbonate in conventional units, but, if required, addition may be made at another stage of the process according to the invention.

The poly(diorganosiloxane)/polycarbonate block copolymers produced according to the invention may be used in any applications where known aromatic polycarbonates have hitherto been used and where good flow combined with improved mould release properties and elevated toughness at low temperature are additionally required, such as for example for the production of large exterior automotive components, switch boxes for outdoor use and protective helmets.

The present invention accordingly also provides the use of the poly(diorganosiloxane)/polycarbonate block copolymers obtainable according to the invention for the production of large exterior automotive components, switch boxes for outdoor use and protective helmets.

EXAMPLES

Comparative Example 1a 114.15 g (0.500 mol) of bisphenol A and 113.54 g (0.530 mol) of diphenyl carbonate are weighed out into a 500 ml three-necked flask with a stirrer, internal thermometer and Vigreux column (30 cm, mirrored) with a bridge piece. Atmospheric oxygen is eliminated from the apparatus by applying a vacuum and purging with nitrogen (3 times) and the mixture is heated to 150° C. 0.13 g of cetyltrimethylammonium tetraphenylhydridoborate $(CH_3(CH_2)_{15}N(CH_3)_3(B(C_6H_5)_4)$ (0.05 mol. % relative to bisphenol A) are then added and the resultant phenol distilled off at 100 mbar. The temperature is simultaneously raised to up to 250° C. The vacuum is then improved in stages to 1 mbar and the temperature raised to 260° C. The temperature is then raised to 280° C. and the mixture stirred for 1.5 hours at 0.1 mbar.

A solvent-free polycarbonate with a relative solution viscosity of 1.234 (dichloromethane, 25° C., 5 g/l) is obtained. The phenolic OH value of the polycarbonate is 340 ppm.

Comparative Example 1b

Comparative Example 1a) is repeated, but using tetraphenylphosphonium tetraphenylhydridoborate as the catalyst instead of cetyltrimethylammonium tetraphenylhydridoborate. A light coloured, solvent-free polycarbonate with a relative solution viscosity of 1.254 (dichloromethane, 25° C., 5 g/l) is obtained in this case too. The phenolic OH value of the polycarbonate is 360 ppm.

Example 1

102.7 g (0.45 mol) of bisphenol A, 100.0 g (0.467 mol) of diphenyl carbonate and 5.4 g of α,ω-bisacetoxydimethylpolysiloxane, average degree of polymerisation $P_n=31$, (5 wt. % relative to bisphenol A), are weighed out into a 500 ml three-necked flask with a stirrer, internal thermometer and Vigreux column (30 cm, mirrored) with a bridge piece. Atmospheric oxygen is eliminated from the apparatus by applying a vacuum and purging with nitrogen (3 times) and the mixture is heated to 150° C. 0.13 g of cetyltrimethylammonium tetraphenylhydridoborate $(CH_3(CH_2)_{15}N(CH_3)_3B(C_6H_5)_4$, (0.05 mol. % relative to bisphenol A and diphenyl carbonate) are then added and the resultant phenol distilled off at 100 mbar. The temperature is simultaneously raised to 180°–190° C. within approximately 50 minutes and then slowly raised to 250° C. in a further 2 hours. The vacuum is then improved in stages to 1 mbar and the temperature raised to 280° C. It is at this point that the principal quantity of phenol is eliminated. By further heating at 280° C. and 0.1 mbar for 1.5 hours, a light coloured, solvent-free polycarbonate is obtained with relatively small and uniformly distributed siloxane domains, see FIG. 1. The relative solution viscosity is 1.280 (dichloromethane, 25° C., 5 g/l). The phenolic OH value of the block copolycarbonate is 200 ppm.

Figure 1:
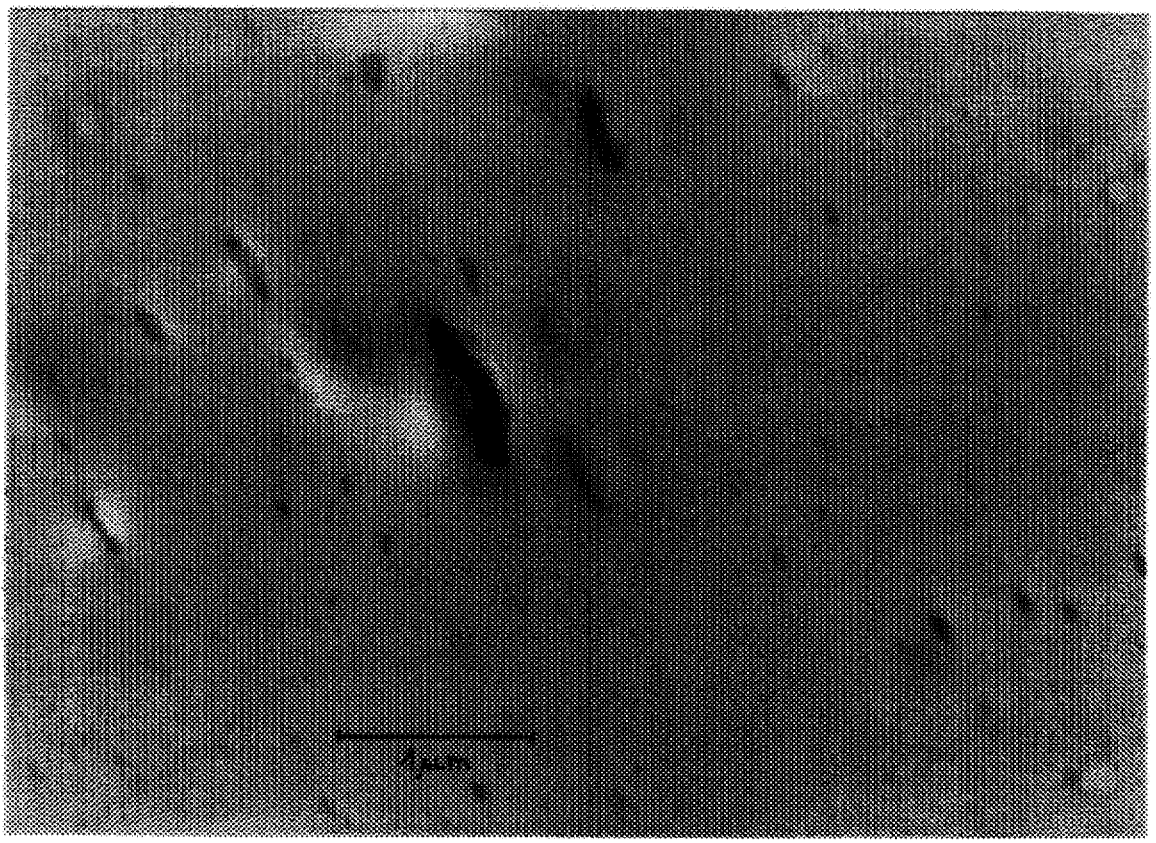
FIG. 1 shows the TEM micrograph of untreated ultra-thin sections of Example 1.

FIG. 1 shows the TEM micrograph of untreated ultra-thin sections of Example 1. The diameter of the siloxane domains ranges from approximately 15 nm to >2 µm, distribution is relatively uniform (HAAN177).

Comparative example 1c 102.7 g (0.45 mol) of bisphenol A, 100.0 g (0.467 mol) of diphenyl carbonate and 5.4 g of α,ω-bisacetoxydimethylpolysiloxane, average degree of polymerisation $P_n=31$, (5 wt. % relative to bisphenol A), are weighed out into a 500 ml three-necked flask with a stirrer, internal thermometer and Vigreux column (30 cm, mirrored) with a bridge piece. Atmospheric oxygen is eliminated from the apparatus by applying a vacuum and purging with nitrogen (3 times) and the mixture is heated to 150° C. 0.3 g of a 1% masterbatch of tetraphenylphosphonium tetraphenylhydridoborate, $P(C_6H_5)_4B(C_6H_5)_4$, in diphenyl carbonate (0.001 mol. % relative to bisphenol A) are then added and the resultant phenol distilled off at 100 mbar. The temperature is simultaneously raised to 250° C. After 1 hour, the vacuum is improved to 10 mbar. Polycondensation is achieved by reducing the vacuum to 0.5 mbar and raising the temperature to 280° C.

Figure 2:
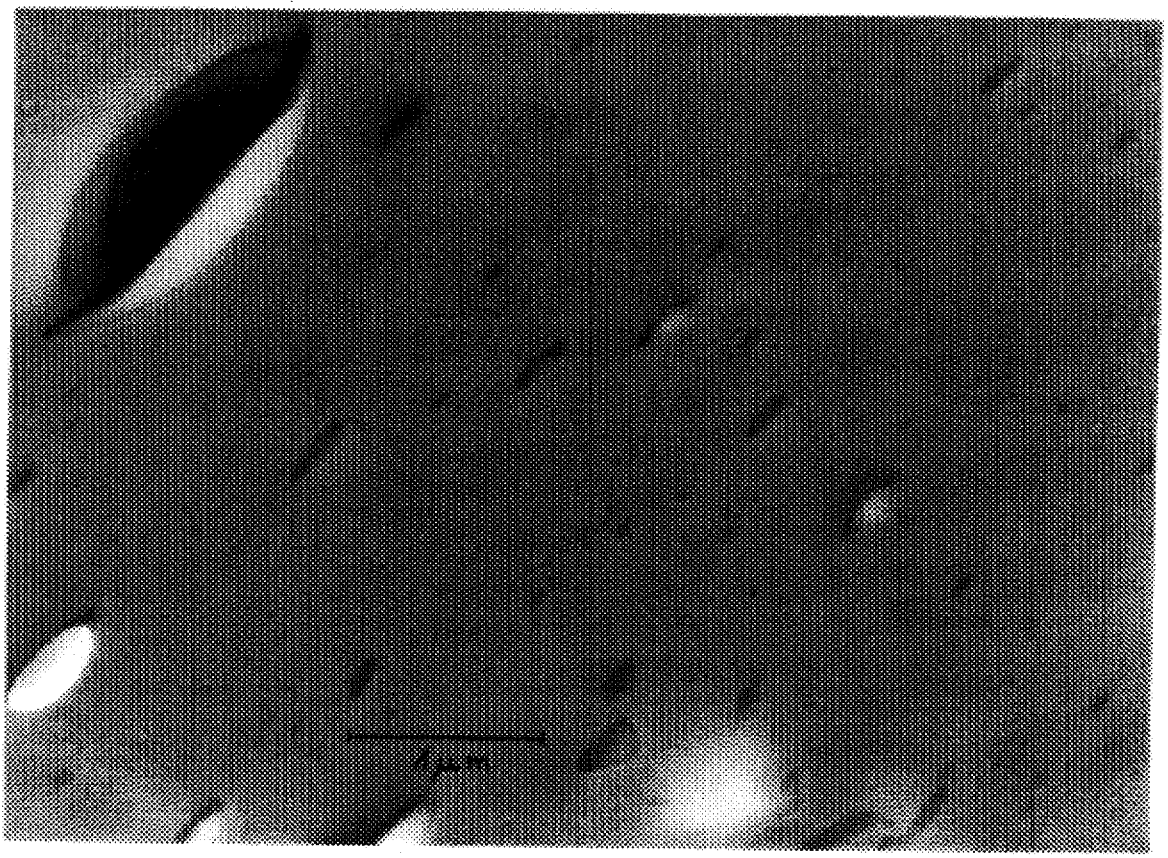
FIG. 2 shows the TEM micrograph of untreated ultra-thin sections of Example 1c.

A light coloured, solvent-free polycarbonate is obtained with relatively large siloxane domains, see FIG. 2. The relative solution viscosity is 1.28 (dichloromethane, 25° C., 5 g/l). The phenolic OH value of the polycarbonate is 200 ppm.

FIG. 2 shows the TEM micrograph of untreated ultra-thin sections of Example 1c. The siloxane domains may be seen as dark particles having a diameter ranging from approximately 0.02 to >2 µm (HAAN 059).

Example 2

102.7 g (0.45 mol) of bisphenol A, 100.0 g (0.467 mol) of diphenyl carbonate and 5.4 g of a bisphenol A terminated polydimethylsiloxane are weighed out into a 500 ml three-necked flask with a stirrer, internal thermometer and Vigreux column (30 cm, mirrored) with a bridge piece.

Atmospheric oxygen is eliminated from the apparatus by applying a vacuum and purging with nitrogen (3 times) and the mixture is heated to 150° C.

0.13 g of cetyltrimethylammonium tetraphenylhydridoborate $(CH_3(CH_2)_{15}N(CH_3)_3)B(C_6H_5)_4$, (0.05 mol. % relative to bisphenol A and diphenyl carbonate) are then added and the resultant phenol distilled off at 100 mbar. The temperature is simultaneously raised to 180°–190° C. within approximately 50 minutes and then slowly raised to 250° C. in a further 2 hours. The vacuum is then improved in stages to 1 mbar and the temperature raised to 280° C. It is at this point that the principal quantity of phenol is eliminated. By further heating at 280° C. and 0.1 mbar for 1.5 hours, a light coloured, solvent-free polycarbonate is obtained with a relative solution viscosity of 1.287 (dichloromethane, 25° C., 5 g/l).

Figure 3:
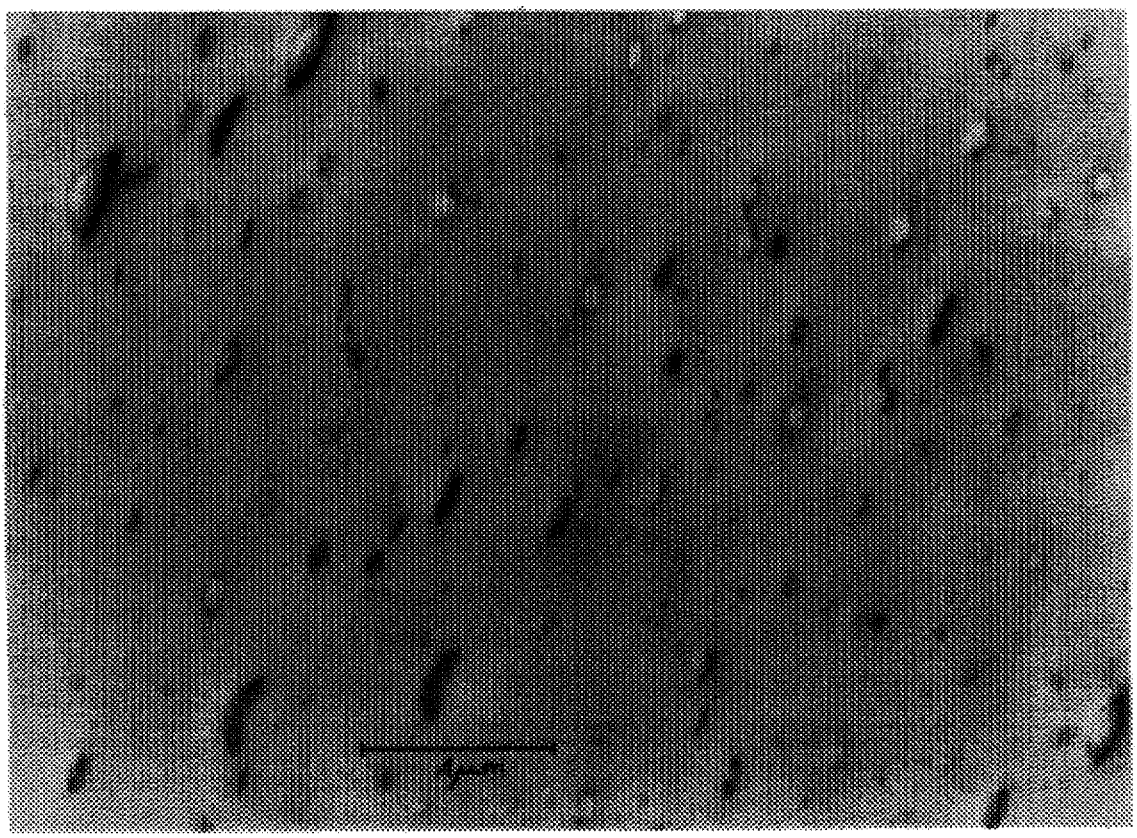
FIG. 3 shows the TEM micrograph of untreated ultra-thin sections of Example 2.

FIG. 3 shows the TEM micrograph of untreated ultra-thin sections of Example 2. The diameter of the siloxane domains ranges from 0.02 to 0.7 µm. The distribution of the siloxane domains is very uniform (HAAN 114/2).

Example 3

102.7 g (0.45 mol) of bisphenol A, 100.0 g (0.467 mol) of diphenyl carbonate and 5.4 g of siloxane of the formula (IIIa)

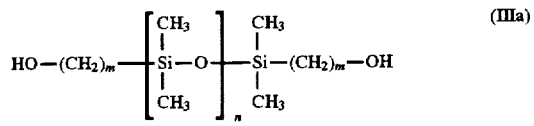

with n=2.4, m=6 and a molecular weight $M_n$ of 810, the production of which is described in *Ullmanns Encyklopädie der technischen Chemie*, volume 15, 1964, 3rd edition, pages 769 et seq. and is commercially available from Th. Goldschmidt as Tegomer H—Si 2111 are weighed out into a 500 ml three-necked flask with a stirrer, internal thermometer and Vigreux column (30 cm, mirrored) with a bridge piece.

Atmospheric oxygen is eliminated from the apparatus by applying a vacuum and purging with nitrogen (3 times) and the mixture is heated to 150° C. 0.13 g of cetyltrimethylammonium tetraphenylhydridoborate $(CH_3(CH_2)_{15}N(CH_3)_3)B(C_6H_5)_4$, (0.05 mol. % relative to bisphenol A) are then added and the resultant phenol distilled off at 100 mbar. The temperature is simultaneously raised to 180°–190° C. within approximately 50 minutes and then slowly raised to 250° C. in a further 2 hours. The vacuum is then improved in stages to 1 mbar and the temperature raised to 280° C. It is at this point that the principal quantity of phenol is eliminated. By further heating at 280° C. and 0.1 mbar for 1.5 hours, a light coloured, solvent-free polycarbonate is obtained with a relative solution viscosity of 1.268 (dichloromethane, 25° C., 5 g/l).

Example 4

100 g of oligocarbonate (relative solution viscosity: 1.147, phenolic end groups 43%, approximately 0.025 mol OH), 117.8 g (0.55 mol) of diphenyl carbonate and 5.0 g of α,ω-bisacetoxydimethylpolysiloxane with an average degree of polymerisation $P_n$ of $P_n$=31, (5 wt. % relative to bisphenol A), are weighed out into a 500 ml three-necked flask with a stirrer, internal thermometer and Vigreux column (30 cm, mirrored) with a bridge piece. Atmospheric oxygen is eliminated from the apparatus by applying a vacuum and purging with nitrogen (3 times) and the mixture is heated to a temperature of 250° C. 0.008 g of cetyltrimethylammonium tetraphenylhydridoborate $(CH_3(CH_2)_{15}N(CH_3)_3)B(C_6H_5)_4$ (0.05 mol. % relative to the phenolic end groups of the oligocarbonate) are then added and the resultant phenol distilled off at 100 mbar. The vacuum is improved in stages over approximately 60 minutes to 10 mbar and then to 0.1 mbar over a further 10 minutes and the temperature raised to 280° C. It is at this point that the principal quantity of phenol is eliminated. By further heating at 280° C. and 0.1 mbar for 1.5 hours and subsequent heating to 300° C. at 0.1 mbar for 2 hours, a light coloured, solvent-free polycarbonate is obtained with a relative solution viscosity of 1.404 (dichloromethane, 25° C., 5 g/l) with a value of the phenolic end groups of the block copolycarbonate of >50 ppm.

We claim:

1. A process for the production of thermoplastic poly(diorganosiloxane)/polycarbonate block copolymers with average molecular weights $M_W$ (weight average, determined by gel chromatography) of 18000 to 60000 by reacting aromatic, Si-free diphenol, carbonic acid diaryl ester and polydiorganosiloxane in the presence of catalyst at a temperature of between 80° C. and 320° C. and pressures of 1000 mbar to 0.01 mbar, wherein the catalyst is a quaternary ammonium compound and/or quaternary phosphonium compound of the formulae (I) and/or (II)

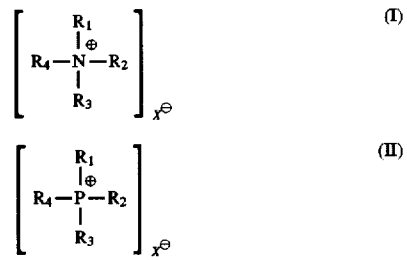

in which $R_{1-4}$ are identical or different $C_1$–$C_{30}$ alkyl, $C_6$–$C_{10}$ aryl or $C_5$–$C_6$ cycloalkyl, wherein at least one of $R_{1-4}$ is a $C_8$–$C_{30}$ alkyl and in which $X^-$ is an anion in which the corresponding acid/base pair $H^{\oplus}+X^{\ominus} \rightleftharpoons HX$ has a pKB of 1 to 11, in quantities of $10^{-1}$ to $10^{-8}$ mol, relative to 1 mol of Si-free diphenol, and further wherein the polydiorganosiloxane component comprises α-ω-bishydroxyaryl-, α-ω-bishydroxyalkyl-, α-ω-bisacyl-, or α-ω-bishydroxyacyl-polydiorganosiloxanes in a quantity by weight of 30 wt. % to 0.5 wt. % relative to the total weight of Si-free diphenol and polydiorganosiloxane.

2. A process according to claim 1, wherein at least one of $R_{1-4}$ is a $C_{12}$–$C_{20}$ alkyl.

3. A process according to claim 1, wherein the polydiorganosiloxane component is α-ω-bishydroxyaryl-,α-ω-bishydroxyalkyl-,α-ω-(bishydroxycaprolactone)- or α-ω-bisacetoxypolydiorganosiloxane.

4. A process according to claim 1, wherein the polydiorganosiloxane component has the formula (III)

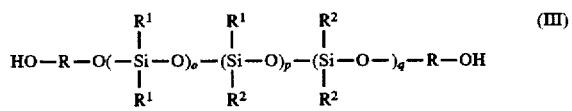

in which R is monocyclic or polycyclic arylene with 6 to 30 C atoms or a linear or branched alkylene with 1 to 30 C atoms, or 3 to 30 C atoms, $R^1$ and $R^2$ are identical or different and are linear alkyl, branched alkyl, halogenated linear alkyl, halogenated branched alkyl, aryl or halogenated aryl and the sum of the diorganosiloxane units "n"=o+p+q is between 5 and 100.

5. Process according to claim 1, wherein the polydiorganosiloxane component has the formula (IV)

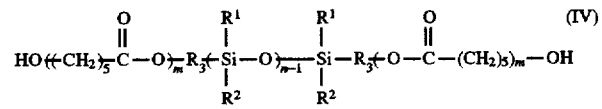

in which $R^1$ and $R^2$ are identical or different and are linear alkyl, branched alkyl, halogenated linear alkyl, halogenated branched alkyl, aryl or halogenated aryl, $R_3$ is a linear alkylene, a branched alkylene, a halogenated linear alkylene, a halogenated branched alkylene or an arylene, and in which "n" is between 5 and 100 and "m" is 1 to 10.

6. A process according to claim 1, wherein the polydiorganosiloxane component has the formula (V)

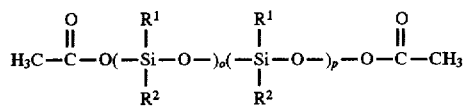 (V)

in which $R^1$ and $R^2$ are identical or different and are linear alkyl, branched alkyl, halogenated linear alkyl, halogenated branched alkyl, aryl or halogenated aryl and the sum of the diorganosiloxane units "n"=o+p is between 5 and 100.

7. A process according to claim 1, wherein the polydiorganosiloxane comprises 7 wt. % to 1 wt. %, relative to the total weight of Si-free diphenol and polydioganosiloxane.

* * * * *